(12) United States Patent
Nakanishi et al.

(10) Patent No.: US 8,141,892 B2
(45) Date of Patent: Mar. 27, 2012

(54) STEERING LOCK STRUCTURE FOR VEHICLE WITH SADDLE

(75) Inventors: Yutaka Nakanishi, Wako (JP); Tomoya Yoshizawa, Wako (JP); Yoshiaki Takeuchi, Wako (JP); Hiroshi Nishijima, Wako (JP); Masakazu Kadota, Wako (JP); Hidekuni Kawasaki, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 138 days.

(21) Appl. No.: 12/710,372

(22) Filed: Feb. 23, 2010

(65) Prior Publication Data
US 2010/0223967 A1 Sep. 9, 2010

(30) Foreign Application Priority Data
Mar. 9, 2009 (JP) ................................. 2009-055417

(51) Int. Cl.
*B62H 5/02* (2006.01)
*B62K 11/00* (2006.01)
*B62K 21/00* (2006.01)
(52) U.S. Cl. ........... 280/271; 70/233; 180/219; 280/272
(58) Field of Classification Search .................. 180/219; 280/271, 276, 277, 279, 280, 272; 70/233, 70/252
See application file for complete search history.

(56) References Cited

U.S. PATENT DOCUMENTS

| | | | | |
|---|---|---|---|---|
| 2,576,773 A | * | 11/1951 | Buxton | 70/233 |
| 2,617,288 A | * | 11/1952 | Hinds | 70/233 |
| 2,625,813 A | * | 1/1953 | Hinds | 70/233 |
| 5,595,079 A | * | 1/1997 | Myers | 70/233 |
| 5,974,843 A | * | 11/1999 | Burkholder | 70/233 |
| 6,237,710 B1 | * | 5/2001 | Mori et al. | 180/219 |
| 2005/0081580 A1 | * | 4/2005 | Nakai et al. | 70/186 |
| 2008/0236216 A1 | * | 10/2008 | Takeuchi et al. | 70/207 |
| 2008/0295551 A1 | * | 12/2008 | Miyamoto | 70/215 |

FOREIGN PATENT DOCUMENTS
JP 2925104 B2 9/1994
* cited by examiner

*Primary Examiner* — Tony H. Winner
*Assistant Examiner* — Marc Scharich
(74) *Attorney, Agent, or Firm* — Ditthavong Mori & Steiner, P.C.

(57) ABSTRACT

A steering lock structure for a vehicle with a saddle includes a steering lock mechanism and left and right frame members. The steering lock mechanism is disposed rearwardly with respect to a head pipe to lock and unlock a rotation of a steering system. The left and right frame members extend in a vehicle rearward direction from the head pipe. The steering lock mechanism is disposed between the left and right frame members. The steering lock mechanism is configured to cause a lock pin to carry out a stroke movement along a vehicle upward and downward direction. The steering lock mechanism is configured to cause the lock pin to be brought into and out of engagement with a top bridge of the steering system which is supported on the head pipe. Thereby, locking and unlocking of the rotation of the steering system are allowed.

17 Claims, 6 Drawing Sheets

STEERING LOCK STRUCTURE FOR VEHICLE WITH SADDLE

CROSS-REFERENCE TO RELATED APPLICATIONS

The present application claims priority under 35 U.S.C. §119 to Japanese Patent Application No. 2009-055417, filed Mar. 9, 2009. The contents of this application are incorporated herein by reference in their entirety.

BACKGROUND OF THE INVENTION

1. Field of the Invention

The present invention relates to a steering lock structure for a vehicle with a saddle.

2. Discussion of the Background

Conventionally, a vehicle with a saddle is known wherein a steering lock mechanism for locking turning movement of a steering system supported on a head pipe at a front end of a vehicle body frame is disposed directly rearwardly of the head pipe (refer to, for example, Japanese Patent No. 2925104). This suppresses mischief on the steering lock mechanism to raise the effect of the steering lock by disposing the steering lock mechanism at a position at which it cannot be observed readily from the outside of the vehicle.

Incidentally, in the conventional technique described above, the steering lock mechanism causes the lock pin to carry out a stroke movement along the vehicle forward and backward direction to place the lock pin into and out of engagement with a stem pipe in the head pipe thereby to allow locking and unlocking of the turning motion of the steering system.

However, with the configuration described above, since the steering lock mechanism causes the lock pin to carry out a stroke movement along the vehicle forward and backward direction, the forward and backward width of the steering lock mechanism is liable to increase. Consequently, the forward and backward width of the arrangement space for the steering lock mechanism rearwardly of the head pipe is liable to increase, and it is difficult to dispose other vehicle component parts rearwardly of the steering lock mechanism.

SUMMARY OF THE INVENTION

According to one aspect of the present invention, a steering lock structure for a vehicle with a saddle includes a steering lock mechanism and left and right frame members. The steering lock mechanism is disposed rearwardly with respect to a head pipe to lock and unlock a rotation of a steering system. The left and right frame members extend in a vehicle rearward direction from the head pipe. The steering lock mechanism is disposed between the left and right frame members. The steering lock mechanism is configured to cause a lock pin to carry out a stroke movement along a vehicle upward and downward direction. The steering lock mechanism is configured to cause the lock pin to be brought into and out of engagement with a top bridge of the steering system which is supported on the head pipe. Thereby, locking and unlocking of the rotation of the steering system are allowed.

According to another aspect of the present invention, a steering lock structure for a vehicle with a saddle includes a steering lock mechanism and left and right frame members. The steering lock mechanism is disposed rearwardly with respect to a head pipe to lock and unlock a rotation of a steering system. The left and right frame members extend in a vehicle rearward direction from the head pipe. The steering lock mechanism is disposed between the left and right frame members. The steering lock mechanism is configured to cause a lock pin to carry out a stroke movement along a vehicle upward and downward direction. The steering lock mechanism is configured to cause the lock pin to be brought into and out of engagement with a bottom bridge of the steering system which is supported on the head pipe. Thereby, locking and unlocking of the rotation of the steering system are allowed.

According to still another aspect of the present invention, a steering lock structure for a vehicle with a saddle includes a steering lock mechanism and an air cleaner. The steering lock mechanism is configured to lock and unlock a rotation of a steering system. The air cleaner is configured to filter engine intake air and disposed rearwardly with respect to a head pipe. The steering lock mechanism is disposed between the head pipe and the air cleaner in a vehicle forward and backward direction.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

In the following, an embodiment of the present invention is described with reference to the drawings. It is to be noted that, unless otherwise specified, the directions such as forward, backward, leftward and rightward directions in the following description are the same as those with regard to a vehicle. Further, in the figures, an arrow mark FR represents the forward direction of the vehicle; another arrow mark LH represents the leftward direction of the vehicle; and a further arrow mark UP represents the upward direction of the vehicle.

Figure 1:
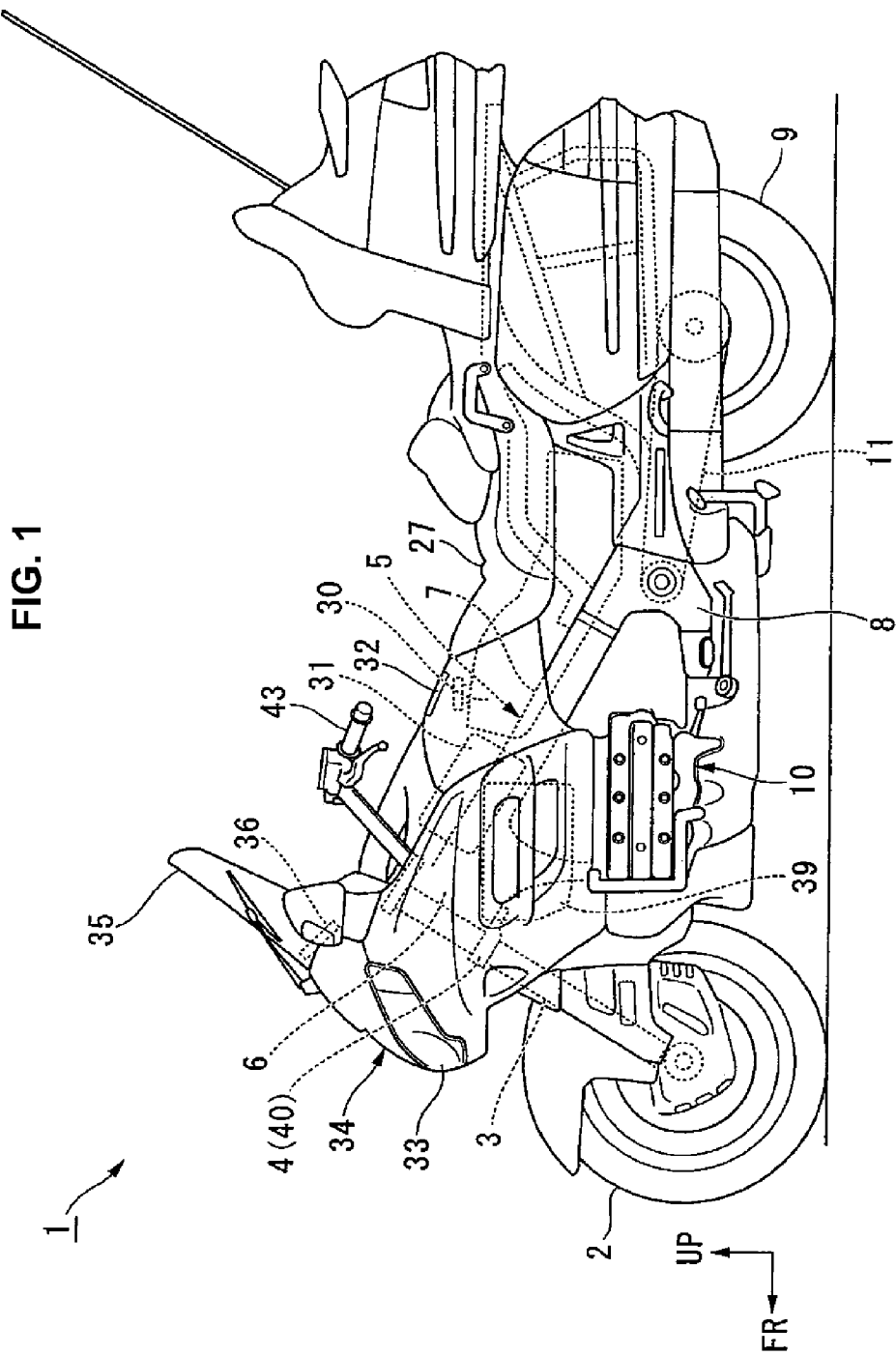
FIG. 1 is a left side elevational view of a motorcycle according to an embodiment of the present invention.

In a motorcycle 1 shown in FIG. 1, a front wheel 2 is supported for rotation at a lower end of a pair of left and right front forks 3, and each of the front forks 3 is supported at an upper portion thereof for steering movement on a head pipe 6 at a front end portion of a vehicle body frame 5 through a steering stem 4.

Figure 5:
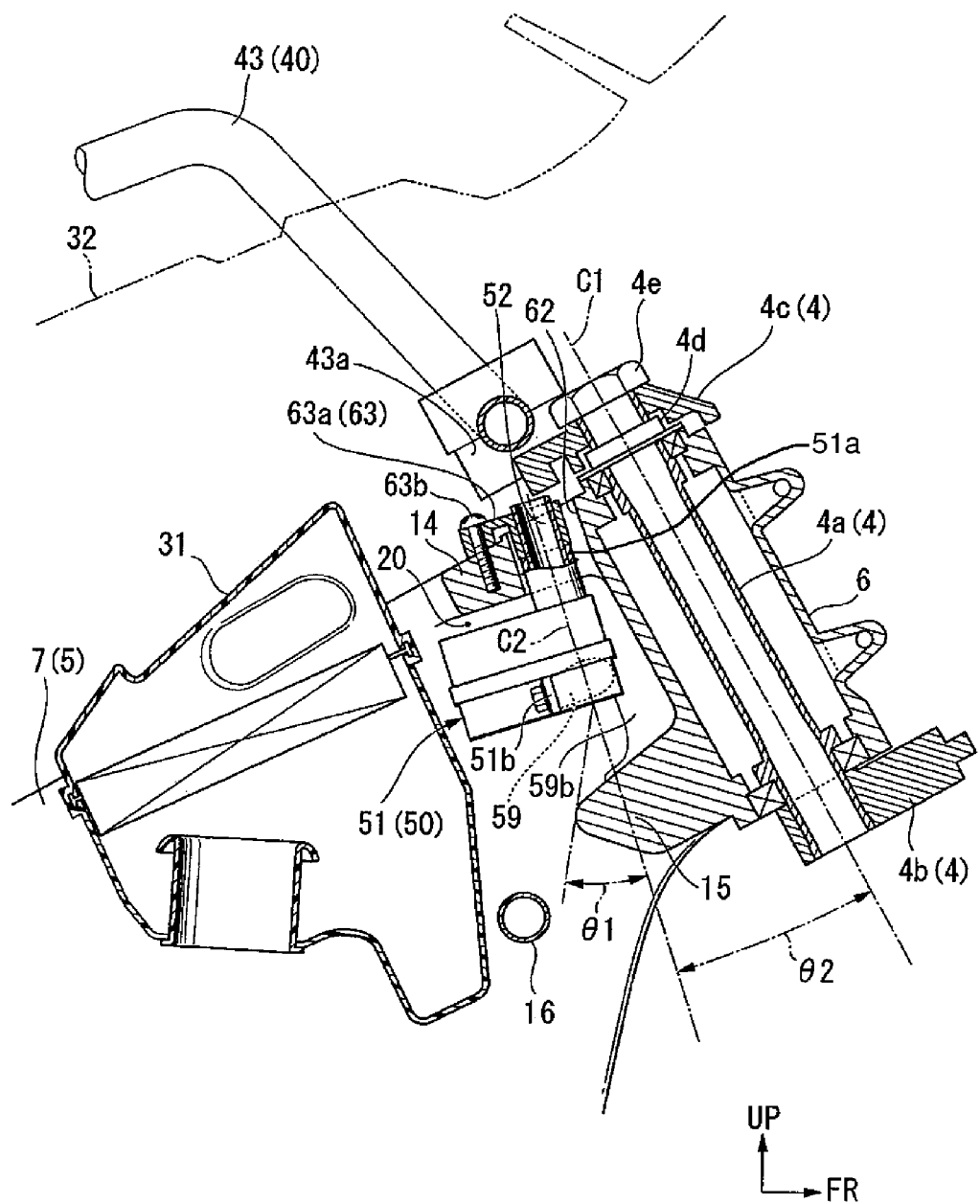
FIG. 5 is a sectional view of components of the motorcycle around a head pipe taken along a center plane in the rearward and forward direction of the vehicle body.

Referring also to FIG. 5, the steering stem 4 has a stem pipe 4a fitted for rotation in the head pipe 6, a bottom bridge 4b fixedly attached to a lower end portion of the stem pipe 4a, and a top bridge 4c disposed in a spaced relationship above the bottom bridge 4b.

The stem pipe 4a is fitted in the head pipe 6 from below and projects upwardly from the head pipe 6, and a lock nut 4d, a leftwardly and rightwardly central portion of the top bridge 4c and a stem nut 4e are attached in order to the projecting portion of the stem pipe 4a. Consequently, the steering stem 4 is supported for rotation around an axial line (steering axial line) C1 on the head pipe 6. Left and right side portions of the bottom bridge 4b and the top bridge 4c extend to the left and right outer sides of the head pipe 6, respectively, and upper portions of the left and right front forks 3 extend through and are supported by the left and right side portions of the bottom bridge 4b and the top bridge 4c.

Figure 6B:
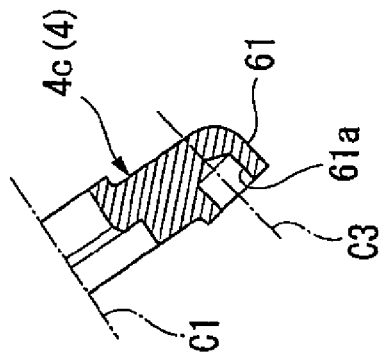
FIG. 6A is a plan view of the top bridge described hereinabove and FIG. 6B is a sectional view taken along line A-A of FIG. 6A.
Figure 6A:
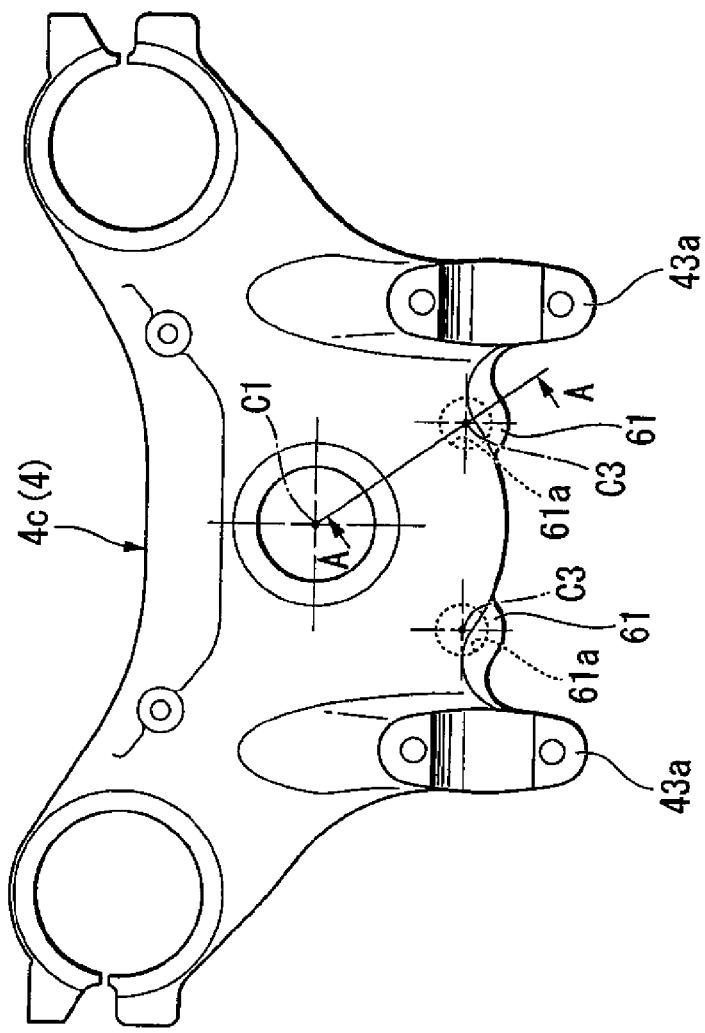

Referring also to FIGS. 6A and 6B, a handle bar 43 for front wheel steering is attached to an upper portion of the top bridge 4c through a pair of left and right handle holders 43a formed integrally on the top bridge 4c. Here, the front wheel 2, left and right front forks 3, steering stem 4 and handle bar 43 construct a steering system 40 of the motorcycle 1, and the steering system 40 is supported for steering movement around the axial line C1 of the head pipe 6.

Figure 4:
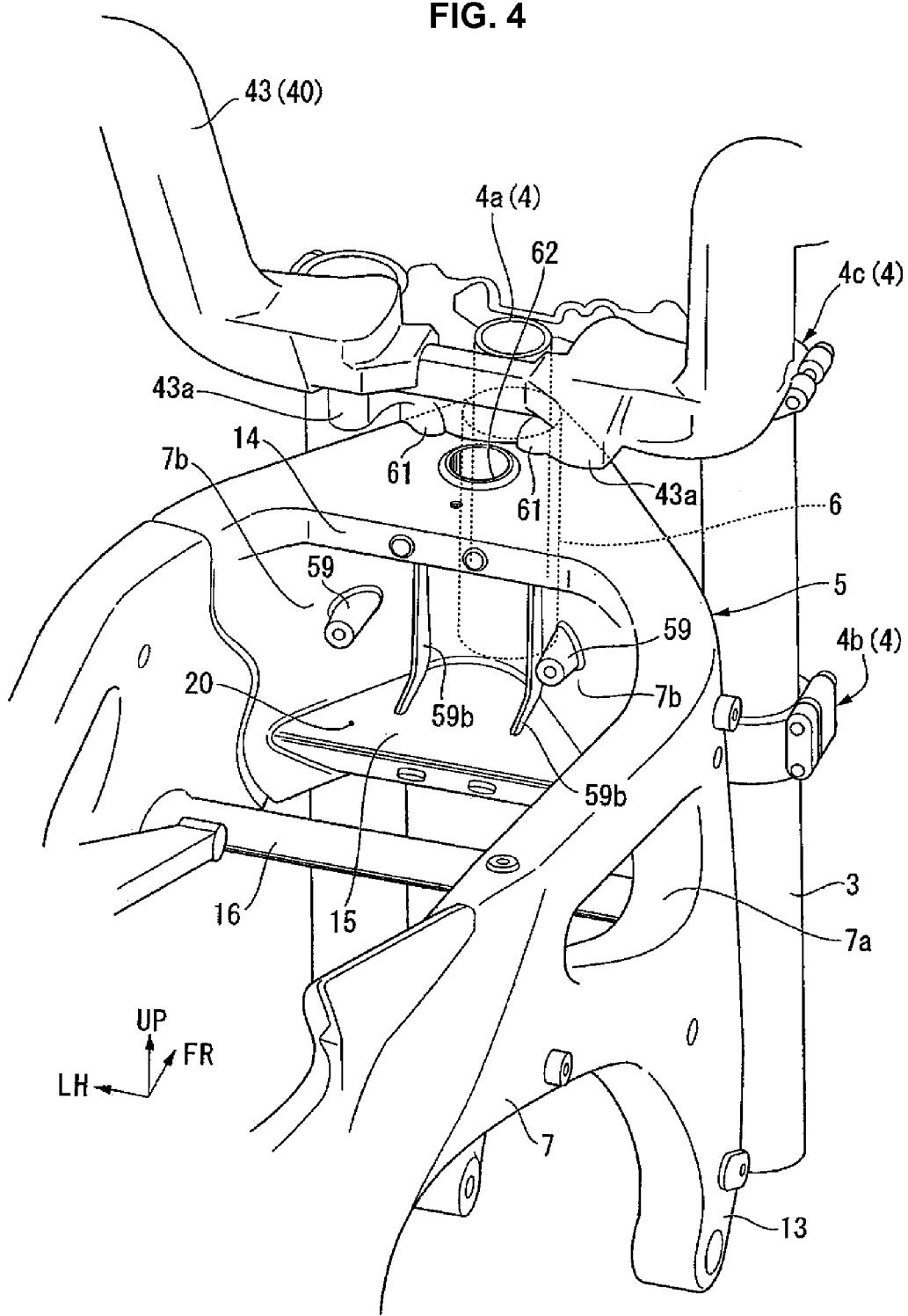
FIG. 4 is a perspective view of part of the motorcycle shown in FIG. 3 with a steering lock mechanism removed.

Referring to FIGS. 1 and 4, a pair of left and right main frames 7 extend obliquely downwardly rearwards from the head pipe 6, and upper end portions of a pair of left and right pivot plates 8 connect to rear end portions of the left and right main frames 7, respectively. A swing arm 11 having a rear wheel 9 supported for rotation at a rear end portion thereof is supported at a front end portion thereof for rocking motion. A drive shaft not shown is fitted in the swing arm 11, and power transmission between the rear wheel 9 and an engine 10 is carried out through the drive shaft. The engine 10 is, for example, of a water-cooled 4-stroke horizontal opposed 6-cylinder type and is supported fixedly below the left and right main frames 7.

Referring to FIG. 1, a fuel tank 30 which extends to a position below a front seat 27 for a rider is disposed forwardly of the front seat 27, and an air cleaner box 31 for engine intake air filtration is disposed forwardly of the fuel tank 30. The vehicle components such as the fuel tank 30, air cleaner box 31 and so forth are covered from above with a top shelter 32 which is an exterior part.

Figure 2:
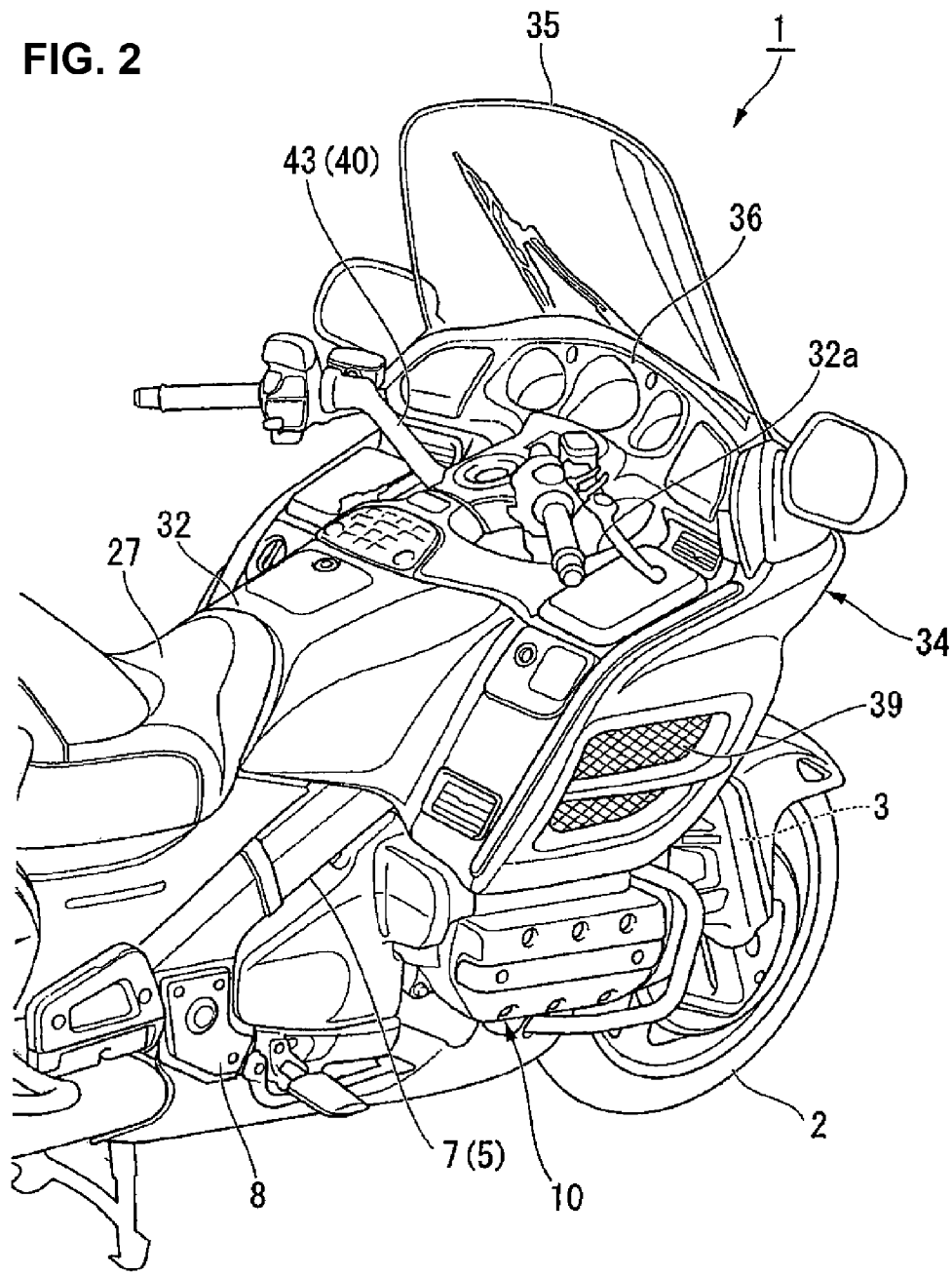
FIG. 2 is a perspective view of a vehicle body of the motorcycle as viewed from a rightwardly upwardly rearward direction.

Referring also to FIG. 2, the top shelter 32 covers, at a front portion thereof, over the surroundings of the head pipe 6 and the steering stem 4, and a pair of left and right elongated holes 32a for taking out left and right grip portions of the handle bar 43 for steering operation are provided at upper portions of a front portion of the top shelter 32.

A front cowl 34 including a pair of left and right headlamps 33 is provided at a vehicle body front portion of the motorcycle 1. A wind screen 35 through which the rider can visually observe forwardly of the vehicle is provided above a front portion of the front cowl 34. A meter panel 36 including a speedometer, a tachometer and so forth is provided on the rear side of an upper portion of the front cowl 34. The top shelter 32 which covers over a range from a rear portion of the front cowl 34 to a front portion of the front seat 27 is provided obliquely downwardly rearwardly with respect to the meter panel 36. A radiator 39 for engine cooling is disposed substantially perpendicularly to the leftward and rightward direction on the leftward and rightward inner side of the front cowl 34.

Referring to FIGS. 1, 4 and 5, the vehicle body frame 5 is formed principally from aluminum alloy and is a so-called twin tube frame wherein the head pipe 6 and the left and right pivot plates 8 are joined together linearly by the left and right main frames 7.

The head pipe 6 has a cylindrical shape inclined such that an upper portion thereof is positioned on the rear side and the left and right main frames 7 extend rearwardly with respect to the vehicle from the head pipe 6 such that they extend along a rearwardly downwardly inclined plane perpendicular to the axial line C1 of the head pipe 6.

The left and right main frames 7 extend in such a manner as to be branched obliquely to the outer sides in the vehicle rearward direction and to the outer sides in the vehicle widthwise direction from the opposite sides of a rear portion of the head pipe 6 and are then curved moderately to the inner side in the vehicle widthwise direction. Thereafter, they extend substantially in parallel to each other and then extend rearwardly with respect to the vehicle. The left and right main frames 7 connect smoothly to upper end portions of the left and right pivot plates 8, respectively.

Tapering engine hangers 13 extending downwardly are provided integrally on the lower side of front portions of the left and right main frames 7, and a front portion of the engine 10 is supported at end portions of the engine hangers 13. It is to be noted that an opening 7a which extends through the left and right main frames 7 in the vehicle widthwise direction is formed in front portions of the left and right main frames 7 to achieve optimization of the rigidity balance of the entire vehicle body frame.

Referring to FIGS. 4 and 5, upper and lower gusset plates 14 and 15 for connecting upper and lower portions of a rear portion of the head pipe 6 and upper and lower portions of a front end portion of the left and right main frames 7 are provided between front end portions of the left and right main frames 7 (on the inner side of the front end portion of the vehicle body frame 5) immediately rearwardly with respect to the head pipe 6. The upper and lower gusset plates 14 and 15 are in the form of a thick plane substantially perpendicular to the axial line C1 of the head pipe 6 and form a substantially triangular shape as viewed in plan wherein the vertex is provided by the head pipe 6 side and the base is provided by the opposite side to the head pipe 6. The upper and lower gusset plates 14 and 15 are disposed in a spaced relationship from each other in the upward and downward direction. Consequently, a concave space 20 which is opened to the rear of the vehicle is formed just rearwardly with respect to the head pipe 6, between the front end portions of the left and right main frames 7 and between the upper and lower gusset plates 14 and 15. It is to be noted that reference numeral 16 in the figures denotes a cross pipe extending between upper end portions of the left and right engine hangers 13.

Here, the front end portion of the vehicle body frame 5 is formed integrally from the head pipe 6, the front end portions of the left and right main frames 7 and the upper and lower gusset plates 14 and 15 by aluminum casting or the like.

Figure 3:
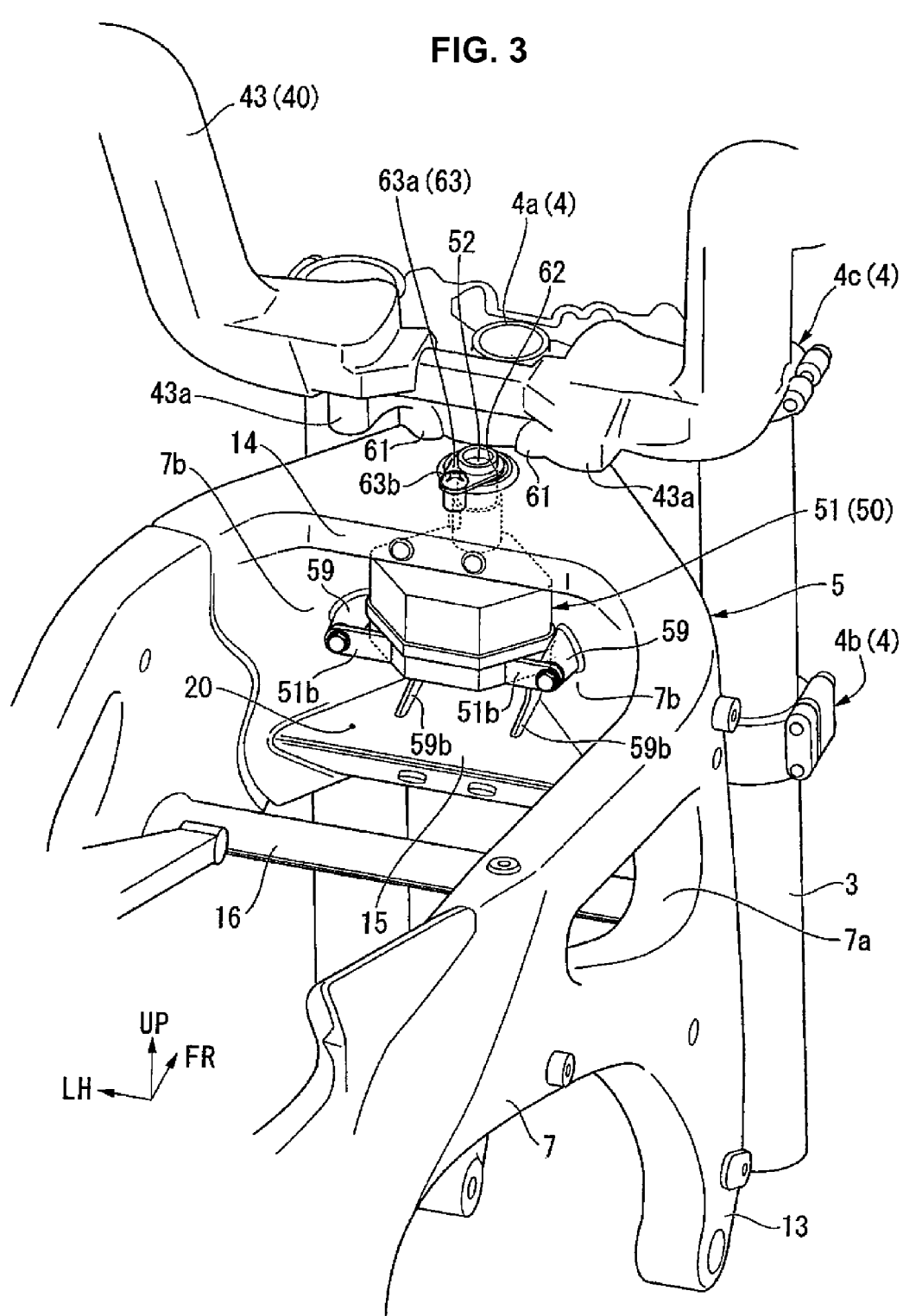
FIG. 3 is a perspective view of part of the motorcycle as viewed from a rightwardly upwardly rearward direction with the exterior removed.

Referring also to FIG. 3, in the space 20 formed between the inner side of a front end portion of the vehicle body frame 5, that is, defined by the portion just rearwardly with respect to the head pipe 6, between the front end portions of the left and right main frames 7 and between the upper and lower gusset plates 14 and 15, a steering lock mechanism 50 for locking rotation of the steering system 40 around the axial line C1.

Referring to FIG. 3, the steering lock mechanism 50 includes, as principal components thereof, a housing 51 in the form of a box accommodated in the space 20, and a lock pin 52 disposed for upward and downward movement at a front portion of the housing 51.

The lock pin 52 has a cylindrical shape and is disposed substantially in parallel to the head pipe 6 (more particularly, rather inclined in an upward erection direction with respect to the head pipe 6). In other words, the lock pin 52 is disposed substantially along the upward and downward direction of the vehicle and carries out a stroke movement (upward and downward movement) along an axial line C2 thereof. Here, the "lock pin 52 is disposed along the upward and downward direction of the vehicle" signifies that, for example, as viewed in side elevation of the vehicle, the inclination angle (θ1 in FIG. 5) of the side of the head pipe 6 which is parallel to the vertical direction with respect to the axial line C2 of the lock pin 52 is within a range from 0° to 45° and the inclination angle (θ2 in FIG. 5) of the axial line C2 of the lock pin 52 with respect to the axial line C1 of the head pipe 6 is within another range from 0° to 30°. More preferably, the axial line C2 is inclined by approximately 20° with respect to the vertical direction and is inclined by approximately 10° with respect to the axial line C1.

The housing 51 has a substantially diamond shape as viewed in top plan and has upper and lower faces substantially perpendicular to the lock pin 52. The lock pin 52 is fitted in and held by the front side of an upper portion of the housing 51.

A pair of left and right fixing portions 51b are provided in a projecting manner on the opposite sides of a lower portion of the housing 51. The housing 51 and hence the steering lock mechanism 50 are attached fixedly to the inner side of a front end portion of the vehicle body frame 5 by screwing and tightening bolts fitted in the fixing portions 51b from rearwardly into and to left and right fixing bosses 59 which project rearwardly from inner side faces (side wall portions) 7b of front end portions of the left and right main frames 7. It is to be noted that a pair of left and right reinforcing ribs 59b extending between the upper and lower gusset plates 14 and 15 are provided uprightly on the left and right inner sides of the left and right fixing bosses 59.

Referring to FIGS. 6A and 6B, a pair of left and right boss portions 61 each having an fitting hole 61a into which an end portion of the lock pin 52 moved upwardly is inserted and fitted from downwardly are provided at a rear portion of the top bridge 4c. The left and right boss portions 61 are formed in such a manner as to be swollen rearwardly from a rear face of the top bridge 4c between the left and right handle holders 43a and are provided such that axial lines (axial lines of the fitting holes 61a) C3 extend substantially in parallel to the axial line C2 of the lock pin 52 (that is, the axial lines C3 are inclined a little with respect to the axial line C1 of the head pipe 6).

The lock pin 52 is moved upwardly in response to a predetermined steering lock operation in a state wherein the steering system 40 is rotated, for example, to a rotation limit position (lock position) on the left or the right, and is inserted from below into the fitting hole 61a of one of the left and right boss portions 61 of the top bridge 4c through the through-hole 62 of the upper gusset plate 14. Consequently, rotation of the steering system 40 is restricted to the left or right turning motion lock position. On the other hand, if a predetermined steering unlock operation is carried out, then the lock pin 52 is removed from the fitting hole 61a of the left or right boss portion 61. Consequently, the restriction is canceled and rotation of the steering system 40 is permitted.

The through-hole 62 of the upper gusset plate 14 allows insertion of the lock pin 52 together with the guide tube 51a therein and is formed substantially in parallel to the lock pin 52. However, taking the assembly performance of the steering lock mechanism 50 and so forth into consideration, the inner diameter of the through-hole 62 is made greater than the outer diameter of the guide tube 51a. Therefore, a collar member 63 for receiving and supporting the end side of the guide tube 51a is attached from above to the through-hole 62 of the upper gusset plate 14. The collar member 63 has a flange portion 63a which extends rearwardly from an upper portion of the collar member 63, and is secured to the upper gusset plate 14 by fastening the flange portion 63a to an upper face of the upper gusset plate 14 by means of a bolt 63b parallel to the lock pin 52. It is to be noted that the through-hole 62, the fitting holes 61a of the left and right boss portions 61 and so forth may be formed in parallel to the head pipe 6 together with the lock pin 52 such that they can be worked in the same direction as that of machining of peripheral elements.

As described above, the steering lock structure according to the embodiment described above is applied to the motorcycle 1 wherein the steering lock mechanism 50 is disposed rearwardly with respect to the head pipe 6 to allow locking and unlocking of rotation of the steering system 40 is configured such that the steering lock structure includes the pair of left and right main frames 7 extending in the vehicle rearward direction from the head pipe, and the steering lock mechanism 50 is disposed between the left and right main frames 7, and that the steering lock mechanism 50 causes the lock pin 52 to carry out a stroke movement along the vehicle upward and downward direction and causes the lock pin 52 to be brought into and out of engagement with the top bridge 4c of the steering system 40 which is supported on the head pipe 6 thereby to allow locking and unlocking of the rotation of the steering system 40.

According to this configuration, since the steering lock mechanism 50 causes the lock pin 52 to carry out a stroke movement along the upward and downward direction of the vehicle, the forward and backward width of the steering lock mechanism 50 is suppressed. Therefore, the forward and backward width of the disposition space for the steering lock mechanism 50 rearwardly with respect to the head pipe 6 is suppressed, and disposition of other vehicle component parts such as intake system parts and a fuel tank rearwardly with respect to the steering lock mechanism 50 is facilitated. Further, upon machining of the top bridge 4c, also the fitting holes 61a for the lock pin 52 can be worked, and formation of the fitting hole 61a can be facilitated. Furthermore, the steering lock mechanism 50 can be disposed efficiently utilizing a space (space 20) formed rearwardly with respect to the head pipe 6 between the left and right main frames 7.

Further, the steering lock structure is configured such that the steering lock structure further includes upper and lower gusset plates 14 and 15 extending over the head pipe 6 and the left and right main frames 7, that the steering lock mechanism 50 is disposed rearwardly with respect to the head pipe 6, between the left and right main frames 7 and between the upper and lower gusset plates 14 and 15, that the through-hole 62 for the lock pin 52 is provided in the upper gusset plate 14 on the side on which the lock pin 52 projects, and that the lock pin 52 is brought into and out of engagement with the top bridge 4c through the through-hole 62.

According to this configuration, the periphery of the head pipe 6 can be configured firmly by the upper and lower gusset plates 14 and 15, and the steering lock mechanism 50 can be disposed efficiently utilizing the space formed between the upper and lower gusset plates 14 and 15.

Further, the steering lock structure is configured such that the top bridge 4c includes the pair left and right boss portions 61 which are swollen rearwardly with respect to the vehicle, and that the fitting hole 61a for the lock pin 52 is provided at the lower face of each of the left and right boss portions 61.

According to this configuration, upon machining working of the top bridge 4c, the fitting holes 61a for the lock pin 52 can be formed readily. Further, it is possible to make the fitting hole 61a less conspicuous and prevent water, dust and so forth from being accumulated in the fitting holes 61a. Furthermore, where the pair of left and right fitting holes 61a are provided, to whichever one of the left side and the right side the steering system 40 is rotated, the rotation of the steering system 40 can be locked. Besides, where the left and right boss portions 61 are formed such that they connect to the pair of left and right handle holders 43a formed on the top bridge 4c, the boss portions 61 and the handle holders 43a can be configured so as to reinforce one another.

Further, the steering lock structure is configured such that the steering lock mechanism 50 is provided on the side wall portions (inner side faces 7b) of the left and right main frames 7. Consequently, the steering lock mechanism 50 can be positioned nearer to the head pipe 6 in comparison with an alternative case wherein an attaching portion or the like for the steering lock mechanism 50 is provided on the rear face of the head pipe 6, and the part disposition space rearwardly with respect to the head pipe 6 can be assured wide.

Further, the steering lock structure described above is configured such that the air cleaner box 31 for filtering engine intake air is disposed rearwardly with respect to the head pipe 6, and the steering lock mechanism 50 is disposed between the head pipe 6 and the air cleaner box 31 in the vehicle forward and backward direction. Therefore, the part disposition space assured rearwardly with respect to the head pipe 6 can be utilized to assure an increased capacity of the air cleaner box 31.

It is to be noted that the present invention is not limited to the embodiment described above, but, for example, it is possible to configure the lock pin 52 so as to project downwardly of the housing 51 and configure the through-hole 62 for the lock pin 52 such that it is formed in the lower gusset plate 15 and the lock pin 52 is fitted into the bottom bridge 4b through the through-hole 62. In this instance, the presence of the steering lock mechanism 50 can be made less conspicuous from the outside of the vehicle, and mischief on the steering lock mechanism 50 can be suppressed thereby to further raise the effect of the steering lock.

Further, the configuration of the embodiment described above is an example of the present invention, and naturally the present invention can be applied not only to motorcycles but also to three-wheel or four-wheel vehicles and it is a matter of course that various alterations can be made without departing from the subject matter of the present invention.

According to the embodiments of the invention, since the steering lock mechanism causes the lock pin to carry out a stroke movement along the upward and downward direction of the vehicle, the forward and backward width of the steering lock mechanism is suppressed. Therefore, the forward and backward width of the disposition space for the steering lock mechanism rearwardly with respect to the head pipe is suppressed, and disposition of other vehicle component parts such as intake system parts and a fuel tank rearwardly with respect to the steering lock mechanism is facilitated. Further, upon machining of the top bridge or the bottom bridge, also the fitting holes for the lock pin can be worked, and formation of the fitting hole can be facilitated. Furthermore, the steering lock mechanism can be disposed efficiently utilizing a space formed rearwardly with respect to the head pipe between the left and right frame members.

According to the embodiments of the invention, the periphery of the head pipe can be configured firmly by the upper and lower gusset members, and the steering lock mechanism can be disposed efficiently utilizing the space formed between the upper and lower gusset plates.

According to the embodiment of the invention, upon machining working of the top bridge, the fitting holes for the lock pin can be formed readily. Further, it is possible to make the fitting holes less conspicuous and prevent water, dust and so forth from being accumulated in the fitting holes. Furthermore, where the pair of left and right fitting holes are provided, to whichever one of the left side and the right side the steering system is rotated, the rotation of the steering system can be locked. Besides, where the left and right swollen portions are formed such that they connect to the pair of left and right handle holders formed on the top bridge, the swollen portions and the handle holders can be configured so as to reinforce one another.

According to the embodiment of the invention, the presence of the steering lock mechanism can be made less conspicuous from the outside of the vehicle, and mischief on the steering lock mechanism can be suppressed thereby to further raise the effect of the steering lock.

According to the embodiment of the invention, the steering lock mechanism can be positioned nearer to the head pipe in comparison with an alternative case wherein an attaching portion or the like for the steering lock mechanism is provided on the rear face of the head pipe, and the part disposition space rearwardly with respect to the head pipe can be assured wide.

According to the embodiment of the invention, the part disposition space assured rearwardly with respect to the head pipe can be utilized to assure an increased capacity of the air cleaner.

Obviously, numerous modifications and variations of the present invention are possible in light of the above teachings. It is therefore to be understood that within the scope of the appended claims, the invention may be practiced otherwise than as specifically described herein.

What is claimed as new and is desired to be secured by Letters Patent of the United States is:

1. A steering lock structure for a vehicle with a saddle, comprising:
    a steering lock mechanism disposed rearwardly with respect to a head pipe to lock and unlock a rotation of a steering system; and
    left and right frame members extending in a vehicle rearward direction from the head pipe, the steering lock mechanism being disposed between the left and right frame members and in a concave space provided by the left and right frame members, the concave space being opened to a rear of the vehicle and provided just rearwardly with respect to the head pipe, the steering lock mechanism being configured to cause a lock pin to carry out a stroke movement along a stroke direction and configured to cause the lock pin to be brought into and out of engagement with a bridge of the steering system which is supported on the head pipe thereby to allow locking and unlocking of the rotation of the steering system, a first inclination angle being provided between a vertical direction of the vehicle and a center line of the head pipe within a range from 0° to 45°, a second inclination angle being provided between the stroke direction of the lock pin and the center line of the head pipe within a range from 0° to 30°.

2. The steering lock structure according to claim 1, further comprising:
    an upper gusset member extending over the head pipe and the left and right frame members, the steering lock mechanism being disposed below the upper gusset member, a through-hole for the lock pin being provided in the upper gusset member on a side from which the lock pin projects, the lock pin being brought into and out of engagement with a top bridge of the steering system through the through-hole.

3. The steering lock structure according to claim 2, wherein the top bridge includes left and right swollen portions which are swollen rearwardly with respect to the vehicle, a fitting hole for the lock pin being provided at a lower face of each of the left and right swollen portions.

4. The steering lock structure according to claim 3, wherein the steering lock mechanism is provided on side wall portions of the left and right frame members.

5. The steering lock structure according to claim 2, wherein the steering lock mechanism is provided on side wall portions of the left and right frame members.

6. The steering lock structure according to claim 1, wherein the bridge includes left and right swollen portions which are swollen rearwardly with respect to the vehicle, a fitting hole for the lock pin being provided at an opposite face of each of the left and right swollen portions, the opposite face of each of the left and right swollen portions being provided to face a gusset member of the steering system.

7. The steering lock structure according to claim 6, wherein the steering lock mechanism is provided on side wall portions of the left and right frame members.

8. The steering lock structure according to claim 1, wherein the steering lock mechanism is provided on side wall portions of the left and right frame members.

9. A steering lock structure for a vehicle with a saddle, comprising:
a steering lock mechanism disposed rearwardly with respect to a head pipe to lock and unlock a rotation of a steering system; and
left and right frame members extending in a vehicle rearward direction from the head pipe, the steering lock mechanism being disposed between the left and right frame members and in a concave space provided by the left and right frame members, the concave space being opened to a rear of the vehicle and provided just rearwardly with respect to the head pipe, the steering lock mechanism being configured to cause a lock pin to carry out a stroke movement along a stroke direction and configured to cause the lock pin to be brought into and out of engagement with left and right portions of the steering system which are attached to a stem pipe of the steering system and respectively extend to left and right outer sides of the head pipe, the left and right portions supporting upper portions of left and right front forks and being supported on the head pipe thereby to allow locking and unlocking of the rotation of the steering system, a first inclination angle being provided between a vertical direction of the vehicle and a center line of the head pipe within a range from 0° to 45°, a second inclination angle being provided between the stroke direction of the lock pin and the center line of the head pipe within a range from 0° to 30°.

10. The steering lock structure according to claim 9, further comprising:
a gusset member extending over the head pipe and the left and right frame members and provided to face the left and right portions, the steering lock mechanism being disposed in the concave space, a through-hole for the lock pin being provided in the gusset member on a side from which the lock pin projects, the lock pin being brought into and out of engagement with the left and right portions through the through-hole.

11. The steering lock structure according to claim 10, wherein the left and right portions respectively include left and right swollen portions which are swollen rearwardly with respect to the vehicle, a fitting hole for the lock pin being provided at an opposite face of each of the left and right swollen portions, the opposite face of each of the left and right swollen portions being provided to face the gusset member.

12. The steering lock structure according to claim 11, wherein the steering lock mechanism is provided on side wall portions of the left and right frame members.

13. The steering lock structure according to claim 10, wherein the steering lock mechanism is provided on side wall portions of the left and right frame members.

14. The steering lock structure according to claim 9, wherein the left and right portions respectively include left and right swollen portions which are swollen rearwardly with respect to the vehicle, a fitting hole for the lock pin being provided at an opposite face of each of the left and right swollen portions, the opposite face of each of the left and right swollen portions being provided to face a gusset member of the steering system.

15. The steering lock structure according to claim 14, wherein the steering lock mechanism is provided on side wall portions of the left and right frame members.

16. The steering lock structure according to claim 9, wherein the steering lock mechanism is provided on side wall portions of the left and right frame members.

17. A steering lock structure for a vehicle with a saddle, comprising:
a steering lock mechanism disposed rearwardly with respect to a head pipe to lock and unlock a rotation of a steering system; and
left and right frame members extending in a vehicle rearward direction from the head pipe, the steering lock mechanism being disposed between the left and right frame members in a concave space provided by the left and right frame members, the concave space being opened to a rear of the vehicle and provided just rearwardly with respect to the head pipe, the steering lock mechanism being configured to cause a lock pin to carry out a stroke movement along a stroke direction and configured to cause the lock pin to be brought into and out of engagement with a bridge of the steering system which is supported on the head pipe thereby to allow locking and unlocking of the rotation of the steering system, the stroke direction of the lock pin being substantially parallel to a center line of the head pipe.

* * * * *